2,907,733

DIPHENOLIC ACID MODIFIED OIL-ALDEHYDE CONDENSATES

Sylvan O. Greenlee, Racine, Wis., assignor to S. C. Johnson & Son, Inc., Racine, Wis.

No Drawing. Application October 1, 1956
Serial No. 612,956

9 Claims. (Cl. 260—20)

This invention relates to new products and compositions resulting from the reaction of hydroxyaryl-substituted acid esters of hydroxylated and/or epoxidized oil acid esters with aldehydes in regulated proportions to produce valuable compositions useful in the manufacture of varnishes, molding compositions, adhesives, films, or molded articles.

One of the objects of the invention is the production of compositions which are essentially reaction products of aldehydes with long-chain acid esters modified by a hydroxyaryl-substituted acid in which the latter is chemically bound to the long-chain ester through esterification of its carboxyl group with a hydroxyl group or an epoxide group attached to the ester chain.

Another object of the invention is the production of plasticized resin-forming compositions capable of polymerizing when heated to form insoluble, infusible compositions.

Another object of the invention is the production of methylol reaction products which are plasticized resin-forming compositions capable of reacting with polyepoxides and phenol formaldehyde condensates, individually and simultaneously, to form insoluble, infusible products.

Other objects of the invention will appear from the following more detailed description with particular reference to the specific illustrative examples.

It is well known in the art that polyhydric phenols are capable of polymerizing with aldehydes and with polyepoxides to form valuable insoluble, infusible products. One of the difficulties encountered by the formulator of products from these phenolic reaction materials is that of obtaining a suitable plasticizer so that the hard, infusible conversion products possess desired flexibility and toughness. One of the most commonly used classes of plasticizers in formulating coating and molding materials is that which embraces the vegetable oil and fish oil acid esters as well as the long-chain saturated fatty acid esters. In using these materials as plasticizers, however, the formulator is limited to choosing resins which are sufficiently compatible with these materials so that no separation into two physical phases takes place during application or during conversion of the product. It is also well known that the alkylidene diphenols, such as the well-known Bisphenol "A" of commerce [bis(4-hydroxyphenyl)dimethyl methane] forms, in reactions with aldehydes, compositions which are extremely immiscible with most commercial plasticizers, including the long-chain acid esters. It will be recognized from the following description that the hydroxyaryl-substituted acids are alkylidene diphenols containing within the same molecule a carboxyl group. It has now been found that this carboxyl group may be esterified with the hydroxyl groups or epoxide groups of hydroxylated and/or epoxidized long-chain acid esters to produce complex polyhydric phenols in which the polyhydric phenols are chemically bound to the plasticizing long-chain acid esters. Such compositions may then be reacted with an aldehyde, such as formaldehyde, to give intermediate reaction products which, on the application of heat, convert to self-plasticized insoluble, infusible products possessing particular value in the protective coating field.

The hydroxylated or epoxidized long-chain acid esters, reacted with the hydroxyaryl-substituted acid to form one component of this invention, are those containing the residues of acids of at least about 10 carbon atoms and low molecular weight alkanols. It is important that the acids selected contain a group which will esterify a carboxyl group. Thus, the desired acid should contain a hydroxyl and/or epoxide group or it should be capable of modification for the purpose of adding such reactive groups. Naturally-occurring vegetable or fish oils are eminently suitable for this purpose, many being found in the form of esters and containing hydroxyl groups or epoxidizable olefin linkages. Naturally-occurring castor oil, a triglyceride containing hydroxylated ester chains, may be used as such or it may be hydrogenated to saturate the double bond present giving a triglyceride of 12-hydroxystearic acid. Naturally-occurring oiticica oil which is essentially a triglyceride of a keto-acid, licanic acid, may also be hydrogenated to give a triglyceride of 4-hydroxystearic acid. Oiticica oil might also be selectively reduced so as to convert the ketone groups to hydroxyl groups without reducing the olefin unsaturation, thus giving an unsaturated hydroxy ester. Unsaturated vegetable and fish oils may be oxidized by air by a commercial process, usually referred to as blowing, to form products containing esterifiable hydroxyl content. In certain cases, it may be desirable to obtain the hydroxy acid esters of alcohols other than glycerol; in which case, such esters as those of the pentaerythritols, glycols, and the simple monohydric alcohols, such as methyl, ethyl, and butyl alcohols, might be used.

Since an epoxide group is essentially an anhydride of a glycol, epoxidized products are readily esterifiable by acids, making the products obtained by the epoxidation of unsaturated oil acid esters suitable for use herein. Illustrative materials are the epoxidized vegetable oils, such as corn oil, cottonseed oil, soyabean oil, etc. Again, it may often be desirable to use esters other than the naturally-occurring glycerides. The epoxidized esters of, for example, vegetable oil acids with such polyhydric alcohols as the pentaerythritols and the glycols as well as the esters of the monohydric alcohols, such as methyl, ethyl, and butyl alcohols, are very valuable in preparing the compositions used in this invention.

The long-chain unsaturated acid esters contemplated may also include the complex mixed products, as exemplified by an epoxidized alkyd resin prepared from a mixture of phthalic anhydride, soyabean oil acids, and glycerol. Acids having lower molecular weights may be used to prepare the desired esters for use herein. A lower limit of about 10 carbon atoms has been set since the shorter-chain acids are of little value in plasticizing the resinous compositions of this invention. An example of a commercially available lower acid is undecenoic acid, a decomposition product of castor oil acids. It is suitable for present purposes, conforming to the requirements set forth hereinabove, in that it may be readily epoxidized or hydroxylated at the point of unsaturation. In general, the components of these complex mixed products may be a polyol, a polycarboxylic acid, and a long-chain monocarboxylic acid.

The hydroxyaryl-substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carboxyl group of the keto-acid should be positioned next to a terminal methyl group in order to obtain satisfactory yields. Prior applications, Serial Nos. 464,607 and 489,300, filed October 25, 1954, and February 18, 1955, respectively, disclose a number of illustrative compounds suitable for use as the Diphenolic Acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated with alkyl groups of from 1 to 5 carbon atoms as disclosed in my copending application Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

The preparation of the hydroxyaryl-substituted acid esters of hydroxylated and/or epoxidized oil acid esters, which are subsequently reacted with aldehydes in this invention, is accomplished by the usual esterification processes well known in the art and which are more fully described in the Greenlee copending application, Serial No. 522,169, filed July 14, 1955, entitled "Synthetic Esters."

The degree of Diphenolic Acid modification of the hydroxylated or epoxidized oil acid esters may be varied widely in order to give widely varied compositions for the formulation of various products. For example, it may be desirable to esterify a hydroxylated triglyceride vegetable oil with 1 mol of Diphenolic Acid per mol of the oil. For another application it may be desirable to esterify a hydroxylated triglyceride oil with 3 mols of Diphenolic Acid per mol of triglyceride. It would be possible and desirable for certain applications to esterify, for example, an epoxidized soyabean oil with as much as 3 to 7 mols of a Diphenolic Acid per mol of the triglyceride oil.

As expressed hereinbefore, the Diphenolic Acid-modified oils react with aldehydes to form valuable compositions for polymerization to insoluble, infusible products. Such products are inherently flexible due to the plasticizing action of the chemically combined plasticizer, the long-chain acid residues. The aldehyde reaction products of these Diphenolic Acid-modified oil acid esters may be used alone as heat-converting compositions or they may be copolymerized with other phenol-formaldehyde reaction products to form modified conversion products.

The aldehydes contemplated for use herein are illustrated by acetaldehyde and formaldehyde. Formaldehyde has been found to be particularly advantageous in reaction with the Diphenolic Acid modified oils to form the plasticized compositions described herein. Formaldehyde may be used in any one of the commercial forms used in the art of phenol-formaldehyde preparations, including formalin (aqueous solution containing 38–40% formaldehyde) trioxy-methylene, para-formaldehyde, hexamethylenetetramine, and certain formal addition products to alcohols. Other suitable aldehydes are propionaldehyde, n-butyraldehyde, isobutyraldehyde, acrolein, and furfural.

The reaction of the Diphenolic Acid-modified oils with aldehydes to form the compositions of this invention can be carried out by any of a number of known methods well established in the art of phenol-formaldehyde preparations. A preferred method, however, is to conduct the reaction in a medium which acts as a mutual solvent for the Diphenolic Acid-modified oil and the aldehyde. The preferred mutual solvents are those which are inert to reactions with phenolic compositions and aldehydes. Illustrative solvents are acetic acid, dioxane, methyl isopropyl ketone, methyl ethyl ketone, and similar inert lacquer-type solvents. The above-described reactions are usually advantageously performed in the presence of a small amount of catalyst. Suitable catalysts include the mineral acids, e.g. sulfuric acid, hydrochloric acid, etc.; alkaline catalysts, e.g. sodium hydroxide, potassium hydroxide, etc.; organic sulfonic acids and strong organic acids, e.g. p-toluenesulfonic acid, oxalic acid, acetic acid, etc. The reaction product is conveniently isolated as the alkylol addition product, such product can then be used alone or in admixture with other materials in formulating compositions which, on the application of heat, convert to insoluble, infusible, plasticized products.

The final conversion of the alkylol addition product to an insoluble, infusible composition can be performed in the absence of or in the presence of a suitable solvent depending upon the characteristics desired in the final product. In protective coating applications it is usually desirable to apply a product which is essentially a solid dissolved in a solvent, in which instance the applied product undergoes preliminary drying by mere solvent evaporation, and the dry film can then be converted to an infusible, insoluble product on further heat treatment. On the other hand, if the desired end product is a molding or adhesive composition, it is usually desirable to use a composition which contains no solvent and which is sufficiently low melting so that at the final conversion temperature, the composition need not be further softened with solvent or plasticizer. The present invention makes possible the production of final infusible products having acceptable flexibility without the use of plasticizers, although in certain special instances reduced amounts of a plasticizer may be used in admixture with these compositions.

In addition to the preferred method of production described above, the compositions of this invention can be made by mixing the Diphenolic Acid modified oil with the aldehyde in the presence of an organic solvent inert to both components, but in which both components will dissolve, spreading a film and heat converting directly to an insoluble, infusible film. It is also to be understood that it is possible to blend the compositions of this invention with other protective coating, molding and adhesive compositions. The compositions may also be pigmented or compounded with certain inert fillers as desired for specific end uses.

Proportions of Diphenolic Acid modified oils in relation to the aldehyde can be varied over a wide range. Since the reaction with the aldehyde proceeds as a phenol-formaldehyde condensation, the amount of aldehyde which will react is dependent upon the amount of DPA present in the Diphenolic Acid modified oil. It has been found possible to react from 1 to 4 mols of formaldehyde per mol of DPA present in the DPA modified oil, with the desired amount for most purposes being about 2 mols of formaldehyde per mol of DPA. Such ratios have been found to give the most desirable over-all characteristics.

This invention will be further illustrated by the following specific examples, but it should be understood that the invention is not limited thereto. Proportions expressed refer to parts by weight unless otherwise indicated.

Examples I to V, inclusive, illustrate the preparation of a Diphenolic Acid ester of a hydroxylated or epoxidized oil acid ester.

EXAMPLE I

In a 3-neck flask provided with a mechanical agitator, a thermometer, and a reflux condenser attached through a side arm water trap was placed 770 parts of castor oil. The castor oil was heated with continuous agitation until the temperature reached 85° C. at which point 500 parts of 4,4-bis(4-hydroxyphenyl)pentanoic acid were added. Throughout the heating period a slow stream of nitrogen was bubbled through the reaction mixture. The temperature was gradually raised to 215° C. and held at 215–230° C. for 6½ hours to yield 1225 parts of a semi-liquid product having an acid value of 13.5.

EXAMPLE II

Similarly, a mixture of 750 parts of blown castor oil and 500 parts of 4,4-bis(4-hydroxyphenyl)pentanoic acid was gradually heated to 210° C. and held at 210–225° C. for a period of 12 hours, yielding 1149 parts of a semi-liquid having an acid value of 13.6.

EXAMPLE III

Following the procedure described in Example I, a mixture of 132 parts of epoxidized butyl oleate (equivalent weight to epoxide-410) and 88 parts of 4,4-bis(4-hydroxyphenyl)pentanoic acid was heated for a period of 12 hours at 200–235° C. to give 165 parts of a solid product having an acid value of 15.1.

The epoxide values used herein were determined by refluxing for 30 minutes a 2-gram sample with 50 milliliters of pyridine hydrochloride in excess pyridine. After cooling to room temperature, the sample is then back-titrated with standard alcoholic sodium hydroxide. The pyridine hydrochloride solution was prepared by adding 20 milliliters of concentrated HCl to a liter of pyridine.

EXAMPLE IV

A mixture of 600 parts of Admex 710 (an epoxidized soyabean oil, having an equivalent weight to epoxide of 260, obtained as a commercial product from Archer-Daniels-Midland Company) and 600 parts of 4,4-bis(4-hydroxyphenyl)pentanoic acid was heated for 9 hours at 190–215° C., producing 1153 parts of a hard, brittle resin having an acid value of 17.7 and a softening point of 90° C. (Durrans' Mercury Method.)

EXAMPLE V (A) *Preparation of alkyd resin*

In a flask provided with a thermometer, a mechanical agitator and a condenser attached through a water trap was placed 434 parts of glycerol, 1270 parts of oleic acid and the temperature gradually raised with agitation to 220° C. over a period of 2 hours. Reaction was continued for a period of 1½ hours at this temperature until the acid value on the mixture of glycerol and oleic acid had reached 10. At this point 617 parts of phthalic anhydride was added and the temperature was gradually increased to 250° C. and held at this temperature for 2 hours and 30 minutes until the acid value had again decreased to below 10. The final constants on this product were acid value of 6.3, iodine value 69, and viscosity A–1 (Gardner-Holdt Bubble Viscosimeter) at a nonvolatile content of 60% in xylene.

(B) *Epoxidation of alkyd resin*

In a 3-neck flask provided with a thermometer, a mechanical agitator, and a reflux condenser was placed 70 parts of dehydrated acid form of a cation exchange resin (Dowex 50 X–8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 15 parts glacial acetic acid. The mixture of cation exchange resin and acetic acid was allowed to stand until the resin had completely taken up the acid. To this mixture was added 315 parts to the alkyd resin solution described in the above paragraph and 190 parts of xylene. To the continuously agitated reaction mixture was added dropwise 38 parts of 50% hydrogen peroxide. The reaction temperature was held a 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an anion exchange resin of the quaternary ammonium type. Dowex 1 is a styrene-divinylbenzene copolymer illustrated by the formula RR′$_3$N$^+$OH$^-$ where R represents the styrene-divinylbenzene matrix and R′ is a methyl group, manufactured by the Dow Chemical Company). The resulting mixture was then filtered, followed by pressing as much of the solution as possible from the anion exchange resin cake.

(C) *Esterification of epoxidized alkyd resin with a diphenolic acid*

A mixture of 51.5 parts of 4,4-bis(4-hydroxyphenyl) pentanoic acid dissolved in 81 parts of dioxane and 292 parts of the epoxidized alkyd resin solution (34% nonvolatile) was gradually heated with constant agitation to 175° C. over a period of about 6 hours permitting the solvent to be removed by distillation as the temperature rose from 125–175° C. The temperature was held at 175–180° C. for an additional half-hour to give 149 parts of a hard resin having an acid value of 17.1 and a softening point of 80° C.

Examples VI through XV, inclusive, illustrate the preparation of heat-converting compositions by reacting the Diphenolic Acid modified oils with formaldehyde.

EXAMPLE VI

In a 3-necked flask provided with a mechanical agitator, a thermometer and a reflux condenser was placed a mixture of 30 parts of the product of Example I dissolved in 40 parts of methyl isobutyl ketone, 7.6 parts of para-formaldehyde, and .06 part of p-toluenesulfonic acid. With continuous agitation the mixture was heated at 98–100° C. for a period of 2 hours. The resulting solution when spread in thin films of .002″ thickness and heat treated for 30 minutes at 185° C. gave a hard, tack-free, flexible product.

EXAMPLE VII

A mixture of 30 parts of the product of Example I dissolved in 40 parts of dioxane, 7.6 parts of para-formaldehyde, and .06 part of toluenesulfonic acid was heated for 2½ hours at 89–94° C. The resulting solution when spread in thin films of .002″ thickness and heat treated for 1 hour at 200° C. gave a hard, tack-free, flexible product. This product withstood 5% aqueous sodium hydroxide for a period of 2 hours without any deterioration.

EXAMPLE VIII

A mixture of 30.5 parts of the product of Example II dissolved in 40 parts of glacial acetic acid and 7.8 parts of para-formaldehyde was heated for a period of 4 hours at 104° C. The resulting product was washed several times by vigorous agitation with hot water to remove the acetic acid. The resin was then dissolved in methyl ethyl ketone to give a clear resin solution. This product when heat cured for a period of 30 minutes at 185° C. gave a hard, tack-free, flexible product. A film which had been heat treated for a period of 1 hour at 200° C. gave 3½ hours resistance without signs of deterioration to 5% aqueous sodium hydroxide at room temperature.

EXAMPLE IX

A mixture of 60.9 parts of the product of Example II dissolved in 80 parts of methyl isobutyl ketone, 15.6 parts of para-formaldehyde and .114 part of p-toluenesulfonic acid was heated for a period of 1 hour at 97–100° C. During the heating period an additional 25 parts of methyl isobutyl ketone were added to prevent separation of insoluble ingredients. The resulting solution when spread in thin films of .002" thickness and heat treated for 1 hour at 200° C. gave hard, tack-free, flexible products which withstood exposure to 5% aqueous sodium hydroxide for 1½ hours.

EXAMPLE X

A mixture of 30.5 parts of the product of Example II dissolved in 50 parts dioxane, 7.8 parts of para-formaldehyde and .06 part of p-toluenesulfonic acid was heated for 1 hour at 90° C. The resulting solution when spread in thin films of .002" thickness and heat treated for 30 minutes at 185° C. gave hard, tack-free, flexible products.

EXAMPLE XI

A mixture of 41.1 parts of the product of Example III dissolved in 60 parts of methyl isobutyl ketone, 12 parts of para-formaldehyde and .096 part p-toluenesulfonic acid was heated at 96–99° C. for a period of 1 hour. The resulting solution when spread in thin films of .002" thickness and heat treated for a period of ½ hour at 185° C. gave a hard, tack-free, flexible product.

EXAMPLE XII

A mixture of 28.6 parts of the product of Example IV dissolved in 50 parts of methyl isobutyl ketone, 9 parts of para-formaldehyde and .071 part of p-toluenesulfonic acid was heated for a period of 1 hour at 96° C. During the heating period an additional 10 parts of methyl isobutyl ketone were added to the mixture. The resulting solution when spread in thin films of .002" thickness and heat treated for a period of 1 hour at 200° C. gave a hard, tack-free, flexible product which withstood exposure to 5% aqueous sodium hydroxide at room temperature for a period of 45 minutes.

EXAMPLE XIII

A mixture of 28.6 parts of the product of Example IV dissolved in 50 parts of dioxane, 9 parts of para-formaldehyde and .071 part of p-toluenesulfonic acid was heated for a period of 1 hour at 90° C. The resulting solution when spread in thin films of .002" thickness and heat treated for 30 minutes at 185° C. gave a hard, tack-free, flexible product.

EXAMPLE XIV

A mixture of 29 parts of the product of Example V dissolved in 50 parts of methyl isobutyl ketone, 6 parts of para-formaldehyde and .048 part of p-toluenesulfonic acid was heated for a period of 1 hour at 99° C. The resulting solution when spread in thin films of .002" thickness and heat treated for 1 hour at 200° C. gave hard, tack-free, flexible products which withstood exposure to 5% aqueous sodium hydroxide at room temperature for a period of 45 minutes.

EXAMPLE XV

A mixture of 23 parts of the product of Example V dissolved in 50 parts of dioxane, 4.9 parts of para-formaldehyde and .04 part of p-toluenesulfonic acid was heated for a period of 1 hour at 90° C. The resulting solution when spread in thin films of .002" thickness and heat treated for 1 hour at 200° C. gave hard, tack-free, flexible products which withstood 5% aqueous sodium hydroxide at room temperature for a period of 45 minutes.

It should be appreciated that while there are above disclosed but a limited number of embodiments of the product and process of the invention herein presented, it is possible to produce still other embodiments without departing from the inventive concept herein disclosed, and it is desired, therefore, that only such limitations be imposed on the appended claims as are stated therein or required by the prior art.

It is claimed and desired to secure by Letters Patent:

1. A new composition of matter comprising the condensation product obtained by heating formaldehyde and the ester of (A) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and (B) an ester of an aliphatic hydrocarbon alcohol and an aliphatic monocarboxylic acid of from about 10 to 36 carbon atoms, with said acid having in addition to the carboxyl radical at least one radical selected from the group consisting of hydroxyl and oxirane radicals.

2. The composition as described in claim 1 wherein the pentanoic acid (A) consists essentially of 4,4 bis(4-hydroxyaryl)pentanoic acid wherein the hydroxyaryl radical is a hydroxyphenyl radical and is free from substituents other than alkyl groups of one carbon atom.

3. The composition as described in claim 1 wherein the pentanoic acid (A) is 4,4 bis(4-hydroxyphenyl)pentanoic acid.

4. The composition of matter as described in claim 3 wherein (B) is an ester of a monohydric alcohol and an aliphatic monocarboxylic acid.

5. The composition of matter as described in claim 3 wherein (B) is an ester of an alcohol and a hydroxy substituted aliphatic monocarboxylic acid.

6. The composition as described in claim 3 wherein (B) is an ester of an alcohol and an aliphatic monocarboxylic acid containing an oxirane group.

7. The composition as described in claim 3 wherein (B) is an ester of an alcohol and a vegetable oil acid containing at least one member of the group consisting of oxirane and hydroxyl groups.

8. The composition described in claim 3 wherein (B) is an ester of an alcohol and fish oil acid with at least one member of the group consisting of oxirane and hydroxyl groups.

9. A composition of matter comprising the condensation product obtained by heating formaldehyde and an ester of (A) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and (B) an alkyd resin modified with an aliphatic monocarboxylic acid of from about 10–36 carbon atoms, with said acid having in addition to the carboxyl radical at least one radical selected from the group consisting of hydroxyl and oxirane radicals.

No references cited.

UNITED STATES PATENT OFFICE
CERTIFICATE OF CORRECTION

Patent No. 2,907,733                                       October 6, 1959

Sylvan O. Greenlee

It is hereby certified that error appears in the printed specification of the above numbered patent requiring correction and that the said Letters Patent should read as corrected below.

Column 6, line 23, Example V, the portion of the heading designated "(C)" which appears as "diphenolic acid", italicized, should read -- Diphenolic Acid --, italicized.

Signed and sealed this 17th day of May 1960.

(SEAL)
Attest:

KARL H. AXLINE                                            ROBERT C. WATSON
Attesting Officer                                         Commissioner of Patents